United States Patent [19]

Kurihara et al.

[11] Patent Number: 4,536,687
[45] Date of Patent: Aug. 20, 1985

[54] APPARATUS FOR CONTROLLING POWER WINDOW OF VEHICLE

[75] Inventors: Norimitsu Kurihara, Wako; Takeshi Imai, Tokyo, both of Japan

[73] Assignee: Honda Giken Kogyo Kabushiki Kaisha, Tokyo, Japan

[21] Appl. No.: 564,803

[22] Filed: Dec. 23, 1983

[30] Foreign Application Priority Data

Dec. 23, 1982 [JP] Japan .................................. 57-231568
Dec. 23, 1982 [JP] Japan .................................. 57-231570
Dec. 23, 1982 [JP] Japan .................................. 57-198923[U]

[51] Int. Cl.$^3$ .............................................. H02H 7/08
[52] U.S. Cl. ...................................... 318/480; 318/478
[58] Field of Search ............... 318/443, 444, 478, 480, 318/DIG. 2, 446, 467

[56] References Cited

U.S. PATENT DOCUMENTS

| | | | |
|---|---|---|---|
| 2,823,346 | 2/1958 | Weber | 318/469 X |
| 3,689,814 | 9/1972 | Holt | 318/266 |
| 4,035,702 | 7/1977 | Petersen et al. | 318/467 X |
| 4,220,900 | 9/1980 | Mintz | 318/469 X |
| 4,373,149 | 2/1983 | Coste | 318/281 |
| 4,394,605 | 7/1983 | Terazawa | 318/256 X |

FOREIGN PATENT DOCUMENTS

56-146442 11/1981 Japan .................................. 318/443
58-16305 1/1983 Japan .................................. 318/480

*Primary Examiner*—William M. Shoop
*Assistant Examiner*—Bentsu Ro
*Attorney, Agent, or Firm*—Armstrong, Nikaido, Marmelstein & Kubovcik

[57] ABSTRACT

A power window of a vehicle is disclosed wherein a window motor adapted for opening and closing a window of the vehicle is connected to a power source through a window switch for opening and closing the window and a main switch adapted to to be opened and closed in accordance with the opened and closed states of an ignition switch for an engine of the vehicle. The power window of the vehicle is controlled by a window sensor for detecting whether the window is opened or closed and for generating an output signal when the window is open. A detection circuit generates an output signal when the window sensor generates the output signal and the main switch is opened and an auto-close circuit, actuated by the output signal from the detection circuit, operates the window motor in a direction to close the window.

7 Claims, 4 Drawing Figures

4,536,687

APPARATUS FOR CONTROLLING POWER WINDOW OF VEHICLE

BACKGROUND OF THE INVENTION

1. Field of the Invention

The present invention relates to an apparatus for controlling a so-called "power window" which is opened and closed by an electric power derived from a vehicle such as an automobile 2. Description of the Prior Art Hitherto, a power window is adapted to become operative when the ignition switch of ignition circuit for an engine is closed. Therefore, when a driver who notices after removing the ignition key and getting out of the car that he or she forgot to close the window, the driver must insert the ignition key again to close the ignition switch for closing the open window, inconveniently.

SUMMARY OF THE INVENTION

Accordingly, it is an object of the invention to provide simple and effective apparatus for controlling a power window of a vehicle arranged such that whether the window is open or closed is detected when the ignition switch is opened, then the window is automatically closed if it is open, thus overcoming the above-mentioned problem of the prior art.

To this end, according to the invention, there is provided an apparatus for controlling a power window of a vehicle comprising: a window sensor for detecting whether the window is opened or closed generating an output signal when the window is open; a detection circuit adapted to generate an output signal when the window sensor generates the output signal in a state where an ignition switch of engine of the vehicle is opened; and an auto-close circuit actuated by the output signal from the detection circuit to drive a motor, which is used for opening and closing the window, in the direction to close the window.

It is another object of the invention to provide a device to disable the apparatus for controlling a power window of a vehicle to permit the window to be kept open when the ignition switch is opened.

It is still another object of the invention to provide an apparatus for controlling a power window of a vehicle which makes it possible to simplify the circuit configuration as a whole by constituting the auto-close circuit by a motor-driving circuit system and a control circuit system.

It is a further object of the invention to provide an apparatus for controlling a power window of a vehicle adapted to produce an alarm if the window is open when the ignition switch is turned OFF.

According to the above construction, when the ignition switch can be turned OFF, the open window is automatically closed. Therefore, if the driver gets out of the car while leaving the window open undesirably, the window can be automatically closed, conveniently.

The above and other objects, features and advantages of the invention will become clear from the following description of some preferred embodiments thereof taken in conjunction with the accompanying drawings.

DESCRIPTION OF THE PREFERRED EMBODIMENTS

Figure 1:
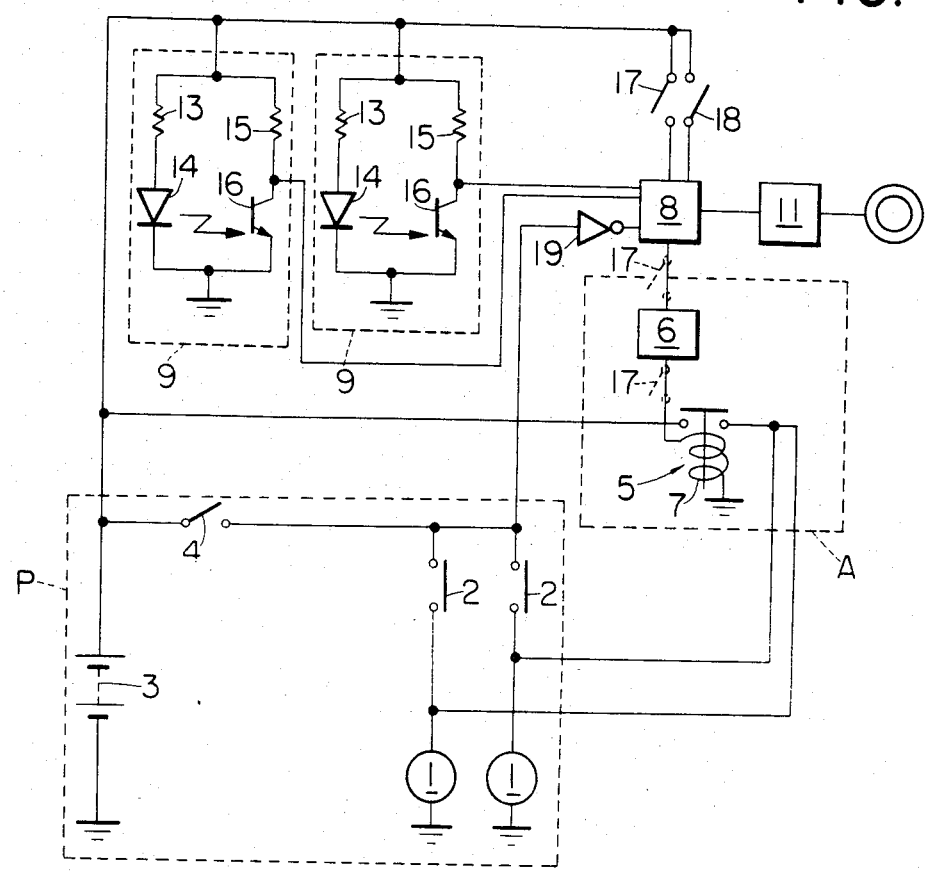
FIG. 1 is an electrical circuit diagram of a first embodiment of the invention.

Embodiments of the invention will be described hereinafter with reference to the accompanying drawings. FIG. 1 shows an apparatus for controlling a power window of a vehicle in accordance with a first embodiment of the invention.

Referring to FIG. 1, a plurality of motors 1, 1 for opening and closing a plurality of windows not shown of a vehicle individually are connected to a power source 3 in parallel with each other through window switches 2, 2 for closing the windows. It will be easily understood that there are also provided another set of window switches for opening the windows, however, the explanation and illustration of those switches and associated circuits are omitted here for simplification of the description of the invention. A common main switch 4 is interposed in an electric circuit connecting the window switches 2, 2 and the power source 3. These elements in combination form a power circuit P for actuating the motors 1, 1 when the engine is in an operative state. The main switch 4 is operatively connected to an ignition switch of an ignition circuit for the engine, not shown, so as to be opened and closed together with the ignition switch. Accordingly, when the main switch 4 is closed, the plurality of windows of the vehicle can be closed individually by actuating the motors 1, 1 through the operation of the window switches 2, 2.

Moreover, between the motors, 1, 1 and the power source 3 is connected to an auto-close circuit A in parallel with the serially connected window switches 2, 2 and the main switch 4. The auto-close circuit A comprises an electromagnetically-operated switch 5 in an electric circuit connecting the motors 1, 1 and the power source 3, and a control circuit 6 adapted for opening and closing the switch 5. A solenoid 7 of the electromagnetically-operated switch 5 is controlled by the control circuit 6. More specifically, the arrangement is such that when the main switch 4 is opened and the windows of the vehicle are open, the solenoid 7 is energized by means of the control circuit 6 to close the electromagnetically-operated switch 5, thereby enabling the window motors 1, 1 to be actuated in the direction for closing the corresponding windows.

The control circuit 6 of the auto-close circuit A is connected to a detection circuit 8, described later, energizes the solenoid 7 of the electromagnetically-operated switch 5 when the detection circuit 8 applies an output signal to the control circuit 6.

Figure 2:
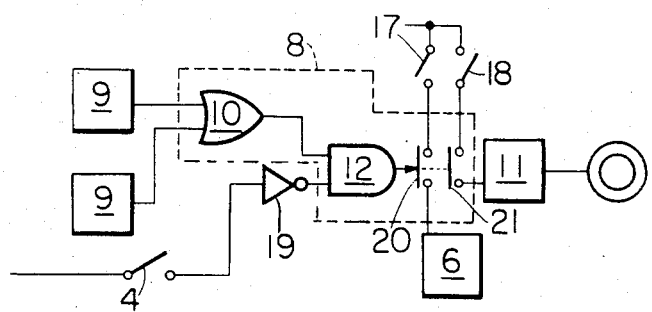
FIG. 2 is a block circuit diagram of an example of a window sensor for detecting whether a window is open or closed in the first embodiment.

The detection circuit 8 is, as shown in FIG. 2, comprises an OR gate 10 connected to a plurality of window sensors 9, 9, the sensors being adapted to detect whether the corresponding windows are open or closed and then to generate output signals when the respective windows are open, and an AND gate 12 having the input side thereof connected to the output side of the OR gate 10 and to the power source 3 through an inverter 19 and the main switch 4. The output side of AND gate 12 connected to the control circuit 6 of the auto-close circuit A and to an alarm 11.

Each window sensor 9 comprises a series circuit consisting of a resistor 13 and a light-emitting element 14 and a series circuit consisting of a resistor 15 and a light-receiving element 16. The series circuits are connected between the power source 3 and the ground in parallel with each other. The window sensor 9 is arranged such that when the corresponding one of the windows of the vehicle is open, the light emitted by the light-emitting element 14 is cut off to make the light-receiving element 16 nonconductive to thereby send a high-level signal to the input side of OR gate 10 of the detection circuit 8.

As shown in FIG. 2, the control circuit 6 of the auto-close circuit A is connected to the power source 3 through a switch 20 and a manual switch 17. On the other hand, the alarm 11 is connected to the power source 3 through a switch 21 and a manual switch 18. The switches 20 and 21 are controlled by the AND gate 12 of the detection circuit 8 so as to be opened and closed in a linked relation to each other. The switches 20 and 21 are both adapted to be closed when the AND gate 12 delivers a high-level signal.

It is to be noted that instead of being connected as shown by a solid line in FIG. 1, the manual switch 17 may be connected between the switch 20 of the detection circuit 8 and the control circuit 6 or between the control circuit 6 and the electromagnetically-operated switch 5 as shown by chain lines in FIG. 1.

The operation of the above-described embodiment will be described hereinafter.

First of all, when the engine is in an operative state, the main switch 4 operatively connected to the ignition switch of the ignition circuit for the engine is also closed, to let the inverter 19 provide a low-level signal to one of the input terminals of the AND gate 12 of the detection circuit 8. Therefore, the output of the AND gate 12 is at a low level to hold the switches 20 and 21 in open state, so that neither the alarm 11 nor the auto-close circuit A is actuated. Accordingly, the windows can be opened and closed as usual by driving the window motors 1, 1 through the operation of the window switches 2, 2 and non-illustrated window switches respectively.

On the other hand, when the operation of the engine is suspended, the main switch 4 is placed in an open state since the ignition switch operatively connected with the switch and is opened at that time. Consequently, a high-level signal is fed through the inverter 19 to one of the input terminals of the AND gate 12. If any one of the windows of the vehicle is open at this time, a high-level signal is delivered from the corresponding window sensor 9 and is applied to the OR gate 10 of the detection circuit 8. Accordingly, both the input terminals of the AND gate 12 become high in level, so that a high-level signal is provided from the output terminal of the AND gate 12, causing the switch 21 to close to actuate the alarm 11 to give an alarm.

Incidentally, by opening the manual switch 18 the alarm 11 can be made inoperative so as to stop alarming.

The output signal from the detection circuit 8 also causes the switch 20 to close to actuate the control circuit 6 of the auto-close circuit A. Therefore, after the alarm 11 is actuated, the electromagnetically-operated switch 5 is closed to actuate the window motors 1, 1 to close the open windows.

In the case where it is not necessary to close the windows, if the manual switch 17 is previously turned OFF, any high-level signal from the AND gate 12 will not actuate the control circuit 6, and since the electromagnetically-operated switch 5 is opened, the window motors 1, 1 are not actuated, so that the open windows are held open.

In the above description, the electromagnetically-operated switch 5 of the auto-close circuit A comprises the switch of the invention, and the solenoid 7 of the electromagnetically-operated switch 5 is the actuating part of the switch of the invention.

According to this embodiment, the auto-close circuit A comprises the electromagnetically-operated switch 5 disposed in the electric circuit connecting the motors 1, 1 and the power source 3, and the control circuit 6 adapted for opening and closing the switch 5. Therefore, it is possible to separately arrange a motor-driving circuit system including the electromagnetically-operated switch 5 and a control circuit system including the control circuit 6 and the detection circuit 8, so that a large current can be supplied to the motor-driving circuit system, while a small current can be separately supplied to the control circuit system. Thus, it becomes possible to remarkably simplify the circuit configuration as a whole.

Moreover, since the manual switch 17 is disposed in the middle of the electric circuit connecting the solenoid 7 as the actuating part of the switch 5 and the power source 3 through the control circuit 6 and the detection circuit 8, the current flowing through the manual switch 17 is small, so that the manual switch 17 can be simplified in construction.

Figure 3:
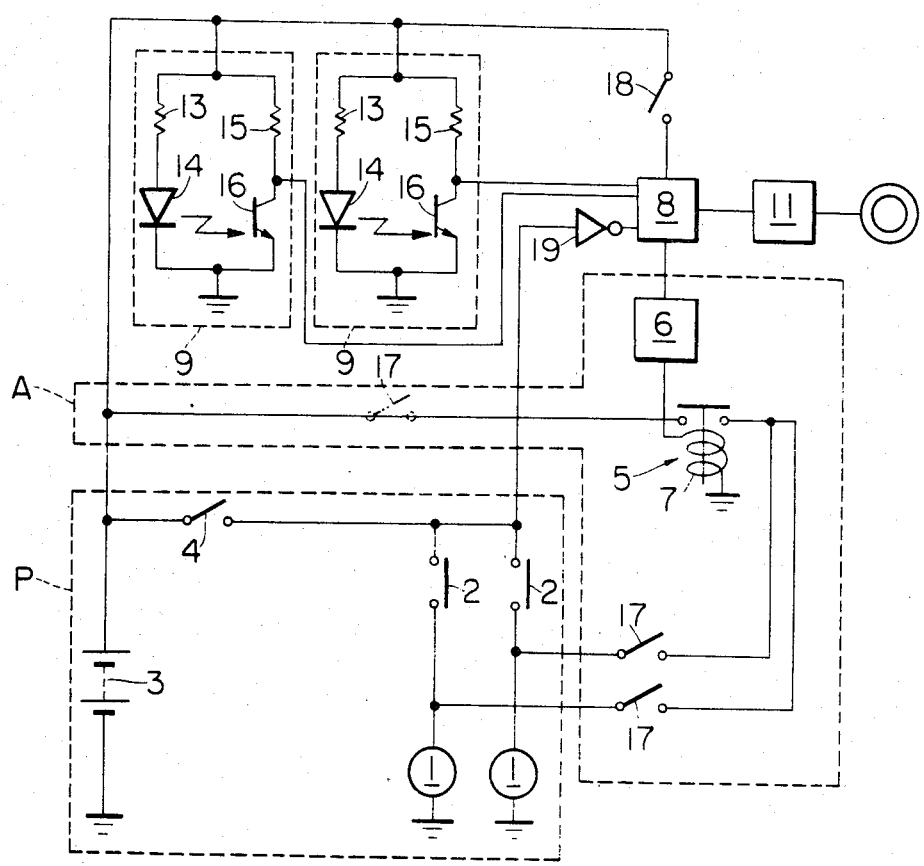
FIG. 3 is an electrical circuit diagram of a second embodiment of the invention.

FIG. 3 shows a second embodiment of the invention, in which the manual switch 17 is disposed in the auto-close circuit A. This manual switch 17 may be interposed between the electromagnetically-operated switch 5 and each of the window motors 1, 1. Alternately, a single manual switch 17 may be interposed between the electromagnetically-operated switch 5 and the power source 3 as shown by a two-dot chain line.

According to this embodiment, also, the windows can be left open by turning OFF the manual switch 17 prior to turning off the ignition. This makes the auto-close circuit A inoperative.

Figure 4:
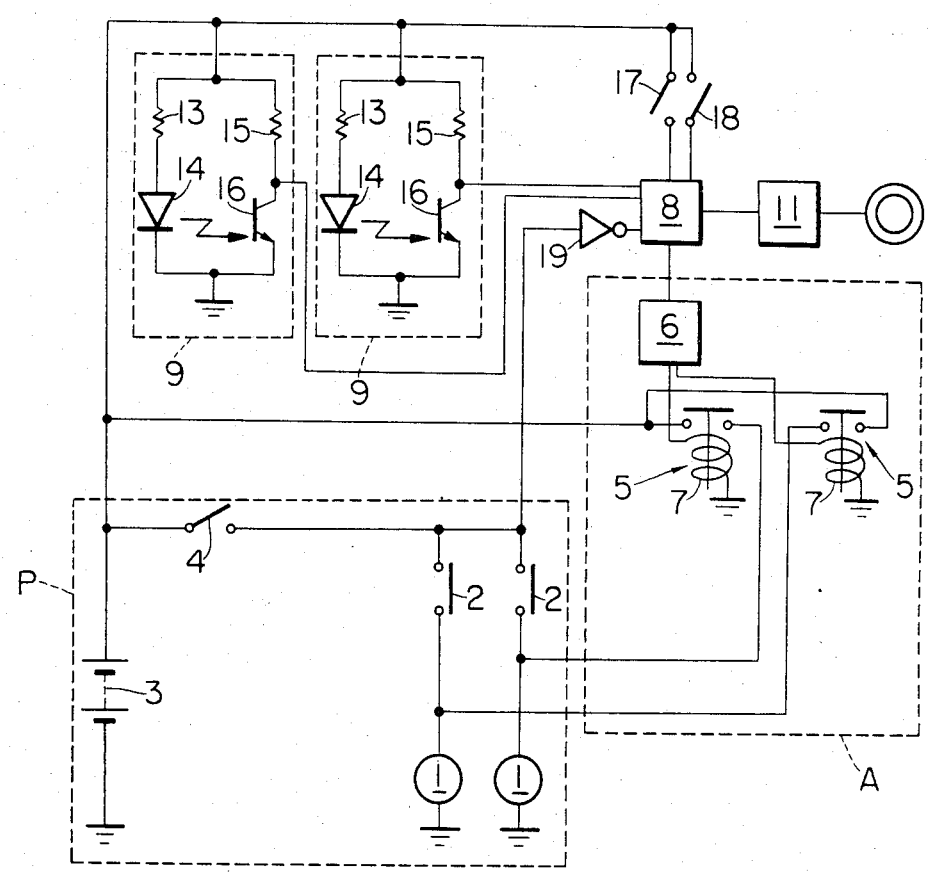
FIG. 4 is an electrical circuit diagram of a third embodiment of the invention.

FIG. 4 shows a third embodiment of the invention, in which in the auto-close circuit A electromagnetically-operated switches 5, 5 are connected to the power source 3 in parallel with each other and are connected to the window motors 1, 1, individually. Moreover, the control circuit 6 is arranged such that when actuated, the control circuit 6 energizes the solenoids 7, 7 of the electromagnetically-operated switches 5, 5 in order, one by one, at a predetermined interval.

According to this embodiment, the window motors 1, 1 are successively actuated by means of the auto-close circuit A. Therefore, a large electric power is not required at one time, unlike the case where the motors 1, 1 are simultaneously actuated. Thus, the circuit configuration can be simplified, advantageously.

Although the invention has been described through specific terms, it is to be noted here that the described embodiments are not exclusive and various changes and modifications may be imparted thereto without departing from the scope of the invention which is limited solely by the appended claims.

What is claimed is:

1. In a power window of a vehicle having a window motor adapted for opening and closing a window of the vehicle, said motor being connected to a power source through a main switch and a window switch for closing the window, said main switch being opened and closed with the opening and closing of an ignition switch for an engine of the vehicle, an apparatus for controlling said power window of the vehicle comprising: a window sensor means for detecting whether said window is open or closed and generating an output signal when said window is open; a detection circuit means for generating an output signal when said window sensor means generates the output signal and when said main switch is open; and an auto-close circuit means actuated by the output signal from said detection circuit means for controlling the operation of said window motor in a direction to close said open window.

2. An apparatus for controlling a power window of a vehicle according to claim 1, wherein a manual switch means is connected in said auto-close circuit means for preventing the operation of said auto-close circuit means when said manual switch is open.

3. An apparatus for controlling a power window of a vehicle according to claim 1 or 2, wherein said auto-close circuit means includes a switch in an electric circuit connected between said window motor and power source, and a control circuit means connected to said detection circuit means for generating an output signal when said window of the vehicle is open and said main switch is open, said control circuit means being actuated by the output signal from said detection circuit means to close said switch in said electric circuit.

4. An apparatus for controlling a power window of a vehicle according to claim 3, inclduing a manual switch connected between an actuating means of said switch of said auto-close circuit means and said power source for preventing the operation of said auto-close circuit means when said manual switch is open.

5. An apparatus for controlling a power window of a vehicle according to claim 1 or 2, further comprising an alarm means connected to said power source, said alarm means being actuated by the output signal from said detection circuit means.

6. An apparatus for controlling a power window of a vehicle according to claim 5, including a manual switch connected between said alarm means and power source for disconnecting said alarm means from said power source.

7. An apparatus for controlling a power window of a vehicle according to claim 1, including a plurality of windows and a window motor corresponding to each window wherein said auto-close circuit means sequentially operates each of said window motors at sequential time intervals to sequentially close the corresponding windows.

* * * * *